United States Patent [19]

Takagi et al.

[11] Patent Number: 5,073,357

[45] Date of Patent: Dec. 17, 1991

[54] PROCESS FOR PRODUCING HYDROXYLAPATITES

[75] Inventors: Osamu Takagi, Seto; Kishiro Azuma, Tokai; Tatsuichi Iwamura, Nagoya, all of Japan

[73] Assignee: Toagosei Chemical Industry, Co., Ltd., Tokyo, Japan

[21] Appl. No.: 554,709

[22] Filed: Jul. 18, 1990

[30] Foreign Application Priority Data

Aug. 1, 1989 [JP] Japan .................................. 1-199807

[51] Int. Cl.$^5$ ...................... C01B 15/16; C01B 25/26
[52] U.S. Cl. ................................ 423/308; 423/305; 423/307; 423/311
[58] Field of Search ............... 423/305, 307, 308, 311, 423/314, 315

[56] References Cited

U.S. PATENT DOCUMENTS

| 3,927,180 | 12/1975 | Chenot | 423/308 |
| 4,335,086 | 6/1982 | Spencer | 423/308 |

FOREIGN PATENT DOCUMENTS

| 53-81499 | 7/1978 | Japan . | |
| 62-176906 | 8/1987 | Japan . | |
| 62-202808 | 9/1987 | Japan | 423/307 |
| 63-159207 | 7/1988 | Japan . | |

OTHER PUBLICATIONS

Analytical Biochemistry-vol. 150, No. 1, Oct. 1985.

*Primary Examiner*—Gregory A. Heller
*Attorney, Agent, or Firm*—Wyatt, Gerber, Burke & Badie

[57] ABSTRACT

Provided is a process for producing hydroxylapatite suitable for chromatographic separation of biopolymers. The process comprises allowing hexagonal prismatic or acicular monetite to react with potassium hydroxide and/or lithium hydroxide under heating.

10 Claims, 3 Drawing Sheets

(×160)

(×2500)

PROCESS FOR PRODUCING HYDROXYLAPATITES

The present invention relates to a process for producing hydroxylapatites especially useful as a packing for chromatographic separation (hereinafter referred to as "separation packing") for biopolymers.

Hydroxylapatites have recently been noticed and developed as artificial bone, implanting materials such as artificial teeth and separation packings for biopolymers such as proteins and nucleic acids.

Hydroxylapatites as separation packings for biopolymers were first developed by Tiselius et al. [A. Tiselius, S. Hjerten and O. Levin; Arch. Biochem. Biophys., 65, 132 (1956)].

This synthesis process comprises dropping and mixing equimolar aqueous calcium chloride solution and aqueous disodium phosphate solution under stirring as gently as possible under room temperature to produce brushite ($CaHPO_4.2H_2O$) and then adding thereto an excess alkali to obtain hydroxylapatites.

However, hydroxylapatites prepared by the above process of Tiselius et al. are in the form of plates small in particle size. Therefore, they have defects that when they are packed in a column such as a glass column and used for chromatography, the flow rate of the biopolymer solution to be developed is very low. Therefore, in order to increase flow rate, it is necessary to forcedly pass the solution under high pressure through the column and thus the hydroxylapatites are not suitable for use as a separation filler on an industrial scale.

For improvement of the process of Tiselius et al, attempts have been made to supplement Ca in brushite [$CaHPO_4.2H_2O$ (Ca/P molar ratio=1)] or monetite [$CaHPO_4$ (Ca/P molar ratio=1)] obtained from brushite to prepare hydroxylapatite [$Ca_{10}(PO_4)_6(OH)_2$ (Ca/P molar ratio=1.67)] or to carry out the synthesis process at a specific temperature.

As the former process, there are inventions disclosed in Japanese Patent Kokai Nos. 53-81499 and 3-159207.

However, neither of them are suitable for practice on an industrial scale because in the process of Japanese Patent Kokai No. 53-81499, reaction is carried out under high temperature and high pressure, and in the process of Japanese Patent Kokai No. 63-159207, wet friction grinding is required.

As the latter process, there are inventions disclosed in Japanese Patent Kokai No. 62-202808 and reported in "Analytical Biochemistry", Vol. 150, No. 1 by one of the present inventors.

As mentioned above, according to the process of Tiselius et al, brushite is first synthesized and then heated in the presence of excess alkali to produce hydroxylapatite. However, according to these processes, reaction is initiated under heated conditions so that monetite is directly produced without production of brushite or brushite is dehydrated with heating to produce monetite and then the monetite is neutralized with addition of alkali to obtain hydroxylapatites.

Hydroxylapatites obtained by these processes have a particle size which has been increased to some extent and, when used as separation packings, have better passing properties for liquid to be treated than those which are obtained by the process Tiselius.

However, hydroxylapatites obtained by the process of Japanese Patent Kokai No. 62-202808 are in the form of plates or flakes which are inherited from the shapes of the raw material monetite. And, hydroxylapatites obtained by the process of "Analytical Biochemistry" cited above are still small in particle size. Therefore, these are still insufficient in liquid passing properties as separation packings for treating a large amount of biopolymer solution on an industrial scale and some means such as pressurizing is required for obtaining sufficient flow rate.

Furthermore, these are both low in crystallinity and fragile in structure and so particles are readily ruptured, and have a further defect that when they are used for chromatography, available pH range is narrow.

It is an object of the present invention to provide a process which produces hydroxylapatites that are excellent in adsorption and elutability for biopolymers and the like and are large in particle size with less formation of fine particles.

According to the present invention, there is provided a process for producing hydroxylapatites, in which hexagonal prismatic or acicular monetite is allowed to react with potassium hydroxide and/or lithium hydroxide under heating.

As mentioned above, it was known to obtain hydroxylapatites by allowing brushite or monetite to react with an alkali under heating, but sodium hydroxide was the only alkali that was used therein.

As a process for preparing monetite which is a starting material for production of hydroxylapatites, have been known a process which comprises mixing and stirring disodium phosphate or dipotassium phosphate and calcium chloride as starting materials at room temperature to obtain brushite and then transforming the brushite to hydroxylapatites by dehydration with heating, a process which comprises mixing and stirring the above starting materials at a high temperature higher than the dehydration transforming temperature, and a process which comprises allowing another known calcium compound and a phosphorus compound to react with each other. However, in order to obtain monetite of hexagonal prismatic or acicular crystal form, the process of mixing and stirring disodium phosphate or dipotassium phosphate and calcium chloride at a high temperature is most preferred. Monetite obtained by transforming brushite by dehydration is usually in the form of plates or flakes.

Since hydroxylapatite [$Ca_{10}(PO_4)_6(OH)_2$] has a molar ratio Ca/P of 1.67 and the reaction for obtaining hydroxylapatites from monetite is in accordance with the following equation: $10CaHPO_4 \rightarrow Ca_{10}(PO_4)_6(OH)_2 + 4H_3PO_4$, a molar ratio of Ca and P which are respectively contained in a calcium compound and a phosphorus compound of starting materials for monetite is preferably within the range of 0.9–1.1.

Monetite prepared from these compounds outside the above range of the molar ratio will produce hydroxylapatites having a molar ratio Ca/P outside 1.67 while producing by-products in addition to pure hydroxylapatites, and may be deteriorated in performance.

The calcium compound and phosphorus compound of starting materials for monetite are supplied as aqueous solutions and concentrations thereof in the solutions are preferably within the range of 0.05–2.0 mol/l, more preferably 0.1–1.0 mol/l.

If the concentration exceeds 2.0 mol/l, by-products such as tricalcium phosphate are present in monetite and eventually purity of hydroxylapatite decreases to cause reduction of adsorption in use as separation packing. On the other hand, if the concentration is less than 0.05 mol/l particle size of the resulting hydroxylapatite is small, which may result in reduction of amount of liquid to be passed therethrough in column.

Within the above-mentioned range of concentration, the higher the concentration, the larger the particle size of particles produced will be and liquid-passing performance is improved and the lower the concentration, the more the adsorption performance increases. Thus, the concentration may be chosen depending on use.

Reaction temperature is preferably at least 75° C. which is the dehydration transforming temperature of brushite, more preferably at least 90° C., especially preferably at least 95° C. If it is lower than 90° C., brushite partially remains unreacted and pure monetite cannot readily be obtained and if it is higher than 100° C., rapid boiling of water takes place and monetite does not readily aggregate but rather tends to become fine particles. However, even if the reaction temperature exceeds 100° C., the above problem can be eliminated by preventing water from boiling, for example, by means of application of pressure.

Then, the desired hydroxylapatites can be obtained by allowing the resulting monetite to react with potassium hydroxide and/or lithium hydroxide under heating.

Specifically, an aqueous solution of potassium hydroxide and/or lithium hydroxide is dropped into hot water which contains monetite or monetite is added to a heated aqueous solution of the above alkali to obtain hydroxylapatites.

Reaction temperature is preferably at least the above-mentioned transformation temperature of brushite and more preferably 90°-100° C. as in the preparation of monetite. If the reaction temperature is lower than the transformation temperature, particle size of the resulting hydroxylapatite is small.

Generally, if this reaction is carried out at a temperature lower than the transformation temperature even for a short period, particle size of the resulting hydroxylapatite tends to become smaller. Therefore, the steps of production from brushite to monetite and from monetite to hydroxylapatite are preferably carried out continuously keeping the proper temperature.

Concentration of the aqueous solution of potassium hydroxide and/or lithium hydroxide has no special limitation, but the lower the concentration, the larger the larger the particle size of the aggregates of hydroxylapatite formed. However, very low concentration would cause deterioration of production efficiency and this would not be practical. Specifically, when an aqueous solution of potassium hydroxide and/or lithium hydroxide is added to a hot water containing monetite, concentration is preferably 0.1-5 mol/, more preferably 0.2-2 mol/l.

Amount of potassium hydroxide and/or lithium hydroxide is preferably 0.4 mol or more per 1 mol of monetite and, for obtaining hydroxylapatites of higher purity, is preferably 0.6 mol or more.

Amount of the alkali used has no upper limitation, but if it is too much, washing of the resulting hydroxylapatites with water becomes troublesome and this is not efficient. Thus, it is preferably 1 mol or less per 1 mol of monetite.

Hydroxylapatites obtained in accordance with the present invention can be preserved in a phosphate buffer solution. Alternatively, they may be dried by heating to make a dry particulate product. The dry product shows no difference in performance from undried products.

The hydroxylapatites obtained in accordance with the present invention are very large in particle size and includes few fine particle of less than 10 $\mu$m and so can be used, as they are, as separation packing without classification by a sieve.

There have been no previous examples of using potassium hydroxide and/or lithium hydroxide in the production of hydroxylapatites nor disclosure of the remarkable effect obtained thereby.

It is not clear why particle size of the resulting hydroxylapatites obtained by reaction of monetite with potassium hydroxide and/or lithium hydroxide under heating is larger than that of hydroxylapatites obtained by using known sodium hydroxide or why the former hydroxylapatites contain fewer fine particles and have higher crystallinity. However, it is supposed that this results from the difference in degree of electrolytic dissociation and atomic radius of these alkali metals.

Figure 1:
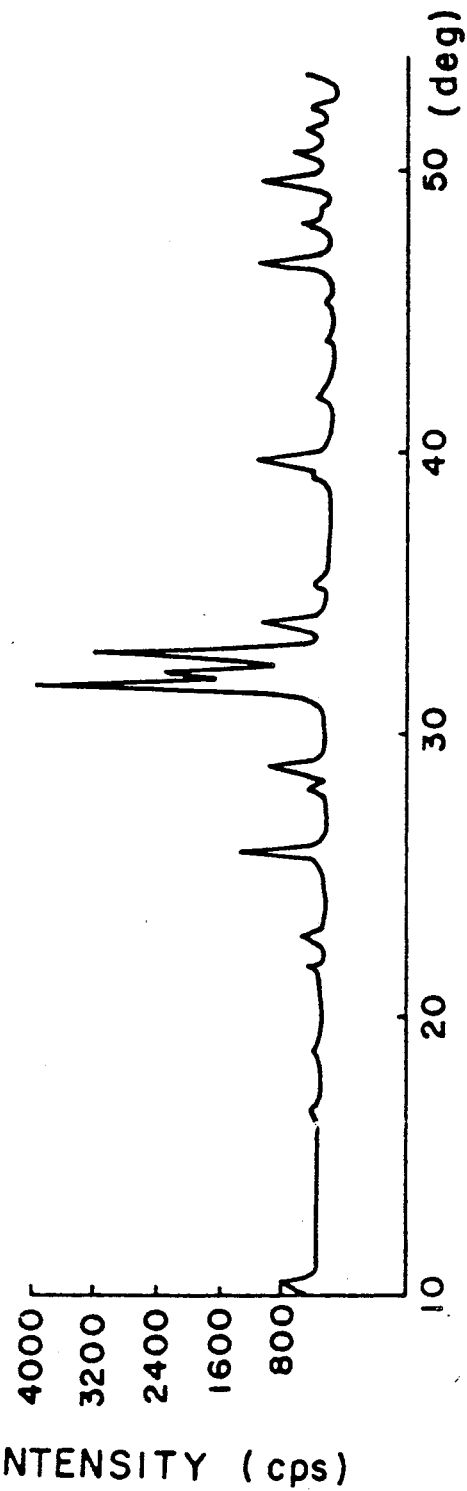
FIGS. 1 and 2 are X-ray diffraction diagrams of hydroxylapatites (A) and (B) obtained in Examples 1 and 2, respectively, in which the abscissa is a degree and the ordinate is an intensity (cps).

The present invention will be explained in more detail by the following examples and comparative examples.

EXAMPLE 1

One liter of pure water was charged in a three-liter flask with a stirrer and a condenser and heated to 95° C. and then, 1 l of an aqueous calcium chloride solution of 0.5 mol/l and 1 l of an aqueous disodium phosphate solution of 0.5 mol/l were added thereto dropwise over a period of 5 hours to obtain aggregates of monetite of hexagonal prismatic crystal form.

Subsequently, at the same temperature, 300 ml of an aqueous potassium hydroxide solution of 1 mol/l in concentration was added dropwise to the aggregate over a period of 1 hour to obtain hydroxylapatite in the form of hexagonal prismatic crystal [hereinafter referred to as "hydroxylapatite (A)"].

EXAMPLE 2

Reaction was carried out under the same conditions as in Example 1 except that lithium hydroxide was used in place of potassium hydroxide, to obtain hydroxylapatite in the form of hexagonal prismatic crystal [hereinafter referred to as "hydroxylapatite (B)"].

EXAMPLE 3

Reaction was carried out under the same conditions as in Example 1 except that dipotassium phosphate was used in place of disodium phosphate, to obtain hydroxylapatite in the form of hexagonal prismatic crystal [hereinafter referred to as "hydroxylapatite (C)"].

EXAMPLE 4

Monetite was prepared under the same conditions as in Example 1 except that 1 l of an aqueous calcium chloride solution of 0.25 mol/l in concentration and 1 l of an aqueous disodium phosphate solution of 0.25 mol/l in concentration were used and reaction temperature was 98° C.

Then, at the same temperature, 200 ml of an aqueous potassium hydroxide solution of 1 mol/l in concentration was added to the resulting monetite over a period of 1 hour to obtain hydroxylapatite in the form of hexagonal prismatic crystal [hereinafter referred to as "hydroxylapatite (D)"].

EXAMPLE 5

Reaction was carried out under the same conditions as in Example 2 except that concentration of an aqueous calcium chloride solution and that of an aqueous disodium phosphate solution were changed to 1 mol/l and that of an aqueous lithium hydroxide solution was changed to 2 mol/l, thereby to obtain hydroxylapatite in the form of hexagonal prismatic crystal [referred to as "hydroxylapatite (E)"].

COMPARATIVE EXAMPLE 1

Reaction was carried out under the same conditions as in Example 1 except that sodium hydroxide was used in place of potassium hydroxide, thereby to obtain hydroxylapatite in the form of hexagonal prismatic crystal [hereinafter referred to as "hydroxylapatite (F)"].

COMPARATIVE EXAMPLE 2

Reaction was carried out under the same conditions as in Example 1 except that ammonia water was used as alkali, thereby to obtain hydroxylapatite in the form of hexagonal prismatic crystal [hereinafter referred to as "hydroxylapatite (G)"].

COMPARATIVE EXAMPLE 3

Brushite was prepared in the same manner as in Example 1 except that 1 l of an aqueous calcium chloride solution of 0.5 mol/l in concentration and 1 l of an aqueous disodium phosphate solution of 0.5 mol/l in concentration were used and reaction temperature was room temperature. Then, at 95° C., 300 ml of an aqueous sodium hydroxide solution of 1 mol/l in concentration was added to the resulting brushite over a period of 1 hour to obtain hydroxylapatite in the form of platy crystal [hereinafter referred to as "hydroxylapatite (H)"].

COMPARATIVE EXAMPLE 4

One liter of pure water was charged in the container used in Example 1 and thereto were added dropwise 1 l of an aqueous calcium chloride solution of 0.5 mol/l in concentration and 1 l of an aqueous disodium phosphate solution of 0.5 mol/l in concentration at room temperature over a period of 5 hours to obtain an aqueous suspension of platy crystal of brushite. This aqueous suspension was heated and boiled for 180 minutes to transform brushite particles to monetite particles by dehydration.

Then, at the same temperature, 300 ml of an aqueous sodium hydroxide solution of 1 mol/l in concentration was added dropwise thereto over a period of 1 hour with stirring, followed by stirring for further 20 minutes to obtain hydroxylapatite [hereinafter referred to as "hydroxylapatite (I)"].

The resulting particles were platy crystals of relatively large particle size, namely, about 3 $\mu$m in thickness and about 10-20 $\mu$m in diameter and contained less fine particles.

Hydroxylapatites obtained above were subjected to the following tests.

Figure 2:
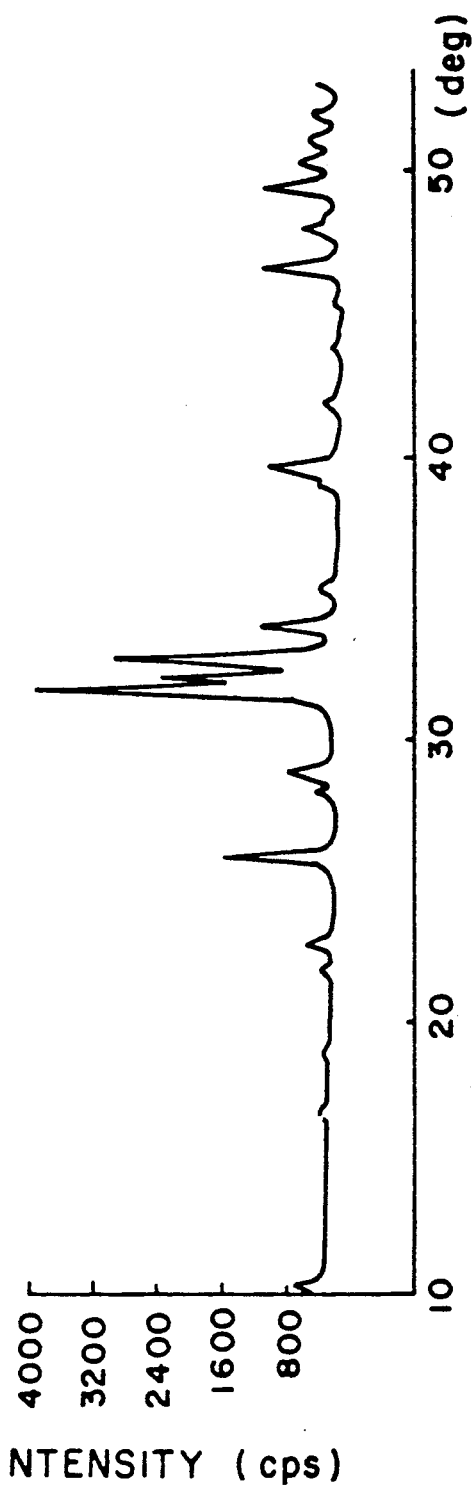

Test on crystallinity:

Crystallinity of hydroxylapatite (A) and hydroxylapatite (B) was examined by powder X-ray diffractiometry. The results are shown in FIGS. 1 and 2.

This test was conducted under the following conditions.

Instrument:
GEIGER FLEX 2028 manufactured by Rigaku Co., Ltd.
Target:Copper
Filter:Nickel
Voltage:30 kV
Current:20 mA
Receiving Slit:0.6 mm
Particle size distribution:

Particle size distribution of the resulting hydroxylapatites (A)–(I) was measured by laser diffraction type particle size distribution measuring apparatus LA-500 manufactured by Horiba Seisakusho Co., Ltd. and median particle size and content of particles of less than 10 $\mu$m were obtained by volume.

The results are shown in Table 1.

Figure 3:
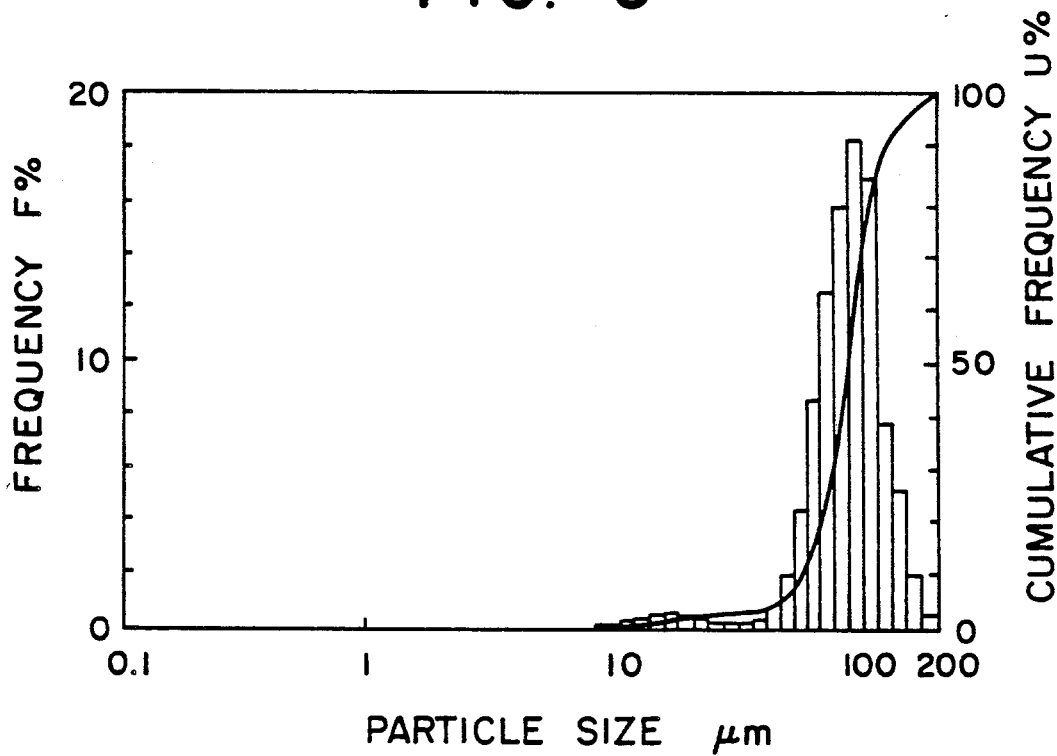
FIGS. 3 and 4 are graphs which show particle size distribution of hydroxylapatites (A) and (B) obtained in Example 1 and Comparative Example 1, respectively, in which the abscissa is a particle size ($\mu$m), the ordinate is a frequency (F, %: reading of bar graph) and a cumulative frequency (U, %: reading of the curve).
Figure 4:
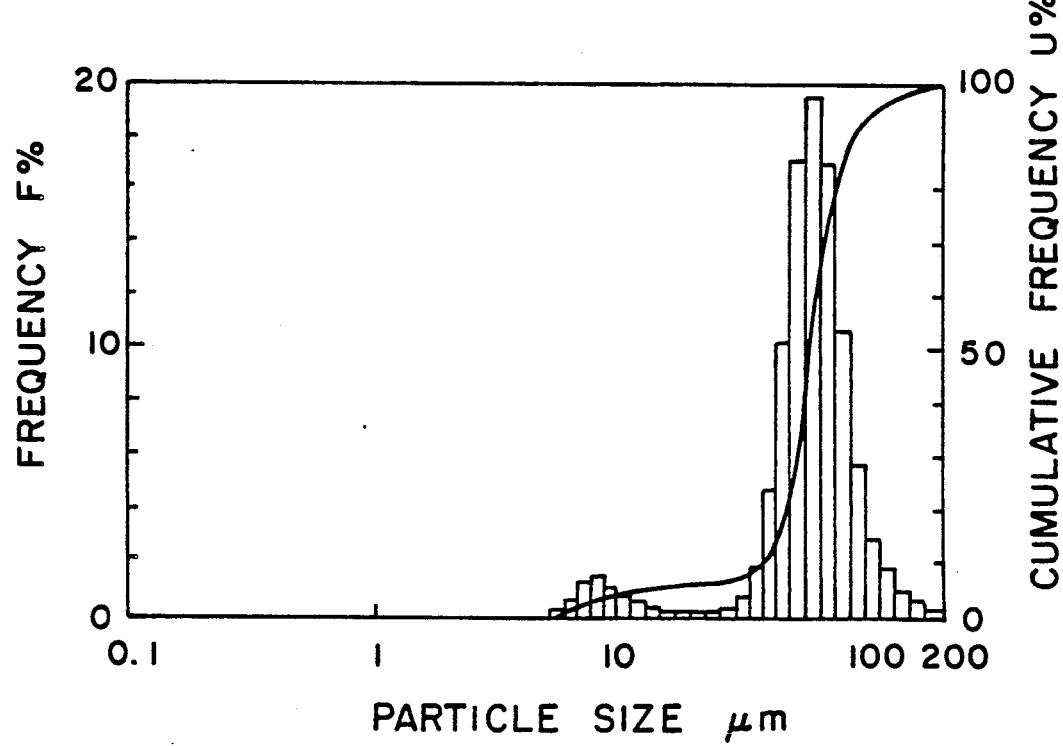
Figure 5:
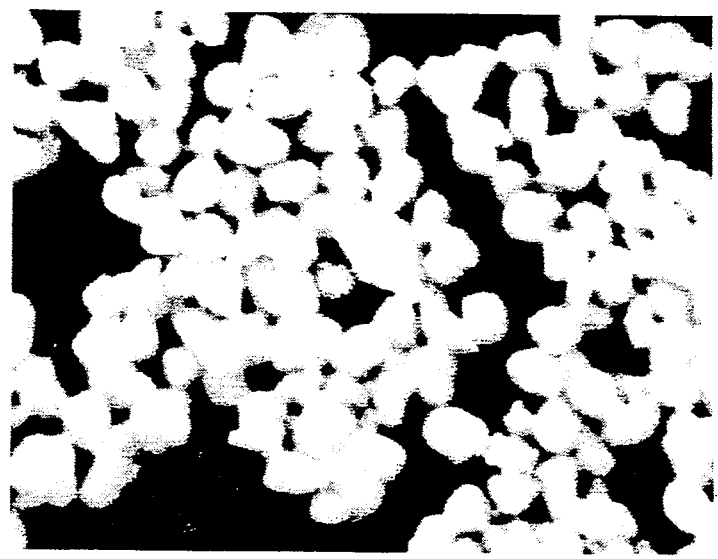
FIG. 5 is an optical microscopic photograph (magnification: ×160) of a particle structure of hydroxylapatite (A) obtained in Example 1
Figure 6:
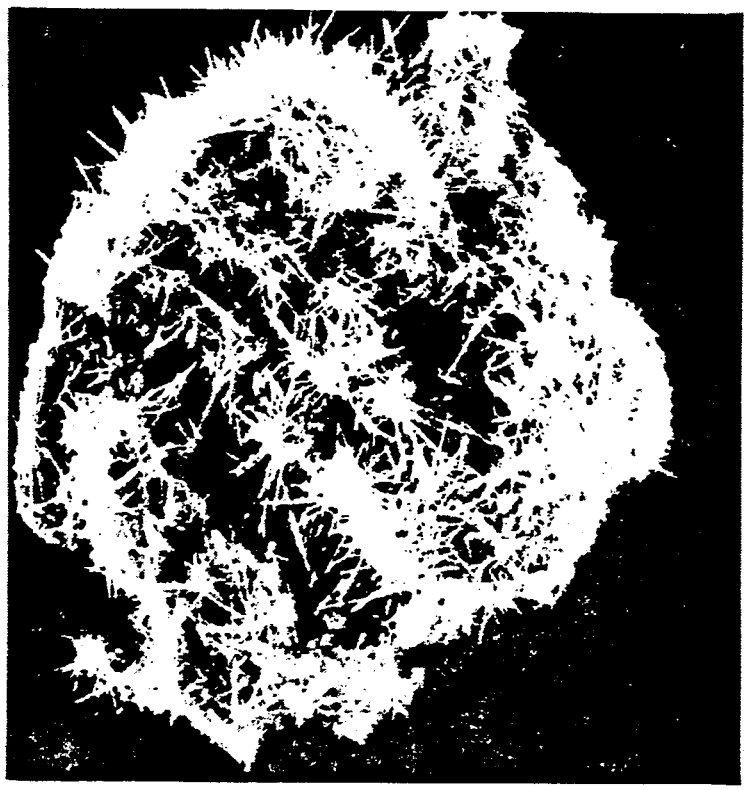
FIG. 6 is a scanning electron micrograph (magnification: ×2500) of the particle structure of the same particles as FIG. 5.

Furthermore, particle size distributions of hydroxylapatites (A) and (F) are shown in FIGS. 3 and 4. Hydroxylapatite (A) had an average particle size of 89.4 $\mu$m and contained 0.2 vol % of particles of less than 10 $\mu$m and hydroxylapatite (F) had an average particle size of 62.8 $\mu$m and contained 4.0 vol % of particles of less than 10 $\mu$m.

From these results, it can be seen that hydroxylapatites obtained using potassium hydroxide or lithium hydroxide are larger in particle size and less in content of fine particles than hydroxylapatites obtained using sodium hydroxide or ammonia.

Test on liquid passing properties:

Hydroxylapatite was packed in a glass open column of 12.5 mm in inner diameter and 40 cm in length at a bed volume of 15 cc and furthermore, pure water was added to adjust the total amount to 30 cc.

A phosphate buffer solution of pH 7.0 was passed through the column under ambient pressure and effluent amount per unit time (cc/hr) was measured.

The results are shown in Table 1.

TABLE 1

| | Hydroxyl-apatite | Median particle size ($\mu$m) | Proportion of particles of less than 10 $\mu$m (vol %) | Passing properties (cc/hr) |
| --- | --- | --- | --- | --- |
| Example 1 | (A) | 89 | 0.2 | 230 |
| Example 2 | (B) | 90 | 0.7 | 190 |
| Example 3 | (C) | 83 | 0.3 | 210 |
| Example 4 | (D) | 87 | 0.4 | 250 |
| Example 5 | (E) | 95 | 0.7 | 270 |
| Comparative Example 1 | (F) | 63 | 4.0 | 70 |
| Comparative Example 2 | (G) | 68 | 2.8 | 110 |
| Comparative Example 3 | (H) | 133 | 3.5 | 10 |
| Comparative | (I) | 10-20 | *1 | 5 |

TABLE 1-continued

| Hydroxyl-apatite | Median particle size (μm) | Proportion of particles of less than 10 μm (vol %) | Passing properties (cc/hr) |
|---|---|---|---|
| Example 4 | | | |

*1: Measurement was not conducted.

Adsorption elution test:

1 mg of lysozyme chloride (yolk reagent manufactured by Tokyo Kasei Co., Ltd.) and 1 mg of bovin serum albumin referred to as "BSA" hereinafter (Fraction V reagent manufactured by Sigma Co., Ltd.) were diluted to 1 mg/ml with a phosphate buffer solution (pH=7.0) of 5 mmol/l and 100 μl of the resulting liquids were passed through glass open columns of 8 mm in inner diameter and 30 cm in height packed with hydroxylapatites (A), (B) and (F) at a bed volume of 10 cc, respectively.

All of the hydroxylapatites adsorbed lysozyme chloride and BSA at a rate of 100%. Next, the adsorbed lysozyme chloride and BSA were eluted by passing phosphate buffer solution (pH=7.0) by linear gradient method with changing concentration of the buffer solution from 5 mmol/l to 300 mmol/l for 30 minutes. Amount of collected sample was determined by gel permeation chromatogram manufactured by Toso Co., Ltd. and elution rate was obtained by the following formula:

elution rate=(elution amount/adsorption amount) ×100 (%)

The results are shown in Table 2.

TABLE 2

| | Hydroxyl-apatite | Elution rate (%) | |
|---|---|---|---|
| | | Lysozyme chloride | BSA |
| Example 1 | (A) | 100.0 | 99.3 |
| Example 2 | (B) | 99.3 | 99.0 |
| Comparative Example 1 | (F) | 98.5 | 99.1 |

The hydroxylapatites obtained in accordance with the present invention are high in crystallinity and large in particle size and, contain few fine particle. Therefore, they can be used without classification as packings to be packed in column for separation. In addition, solution to be treated flows through the column at a sufficiently high flow rate even under ambient pressure. Furthermore, less rupture of particles occurs and so treatment of large amount can be carried out for a long time on an industrial scale. Furthermore, they can be used in a wide pH range.

The hydroxylapatites obtained in accordance with the present invention are suitable especially as separation packing for biopolymers such as protein, nucleic acid and enzyme.

What is claimed is:

1. A process for producing hydroxylapatite which comprises reacting hexagonal prismatic or acicular monetite with at least one compound selected from the group consisting of potassium hydroxide and lithium hydroxide in an aqueous medium at a temperature of from 75° to 100° C.

2. A process according to claim 1, wherein the reaction is carried out at the transformation temperature of brushite or higher.

3. A process according to claim 2, wherein the reaction temperature is 90°-100° C.

4. A process according to claim 1, wherein said potassium hydroxide and lithium hydroxide are in aqueous solution at a concentration of 0.2 to 2 mol/l.

5. A process according to claim 1, wherein the amount of said compound is 0.6 mol of compound per 1 mol of monetite.

6. A process according to claim 1, characterized in that the hydroxylapatite is produced in the form of aggregates of hexagonal prismatic or acicular crystals.

7. A process according to claim 1, wherein the monetite is one prepared by mixing and stirring an aqueous solution of disodium phosphate or dipotassium phosphate and calcium chloride each at a concentration of from 0.05 to 2.0 mol/l at a temperature of from 75° C. to 95° C.

8. A process according to claim 7, wherein the concentration is from 0.1 to 1.0 mol/l.

9. A process according to claim 7 wherein the temperature is from 90° to 95° C.

10. A process according to claim 7 wherein the concentration is from 0.1 to 1.0 mol/l and the temperature is from 90° to 95° C.

* * * * *